(12) United States Patent
Uy et al.

(10) Patent No.: US 7,702,859 B2
(45) Date of Patent: Apr. 20, 2010

(54) DETACHABLE DIRECT MEMORY ACCESS ARRANGEMENT

(76) Inventors: Elwyn Timothy Uy, 2272 Towne Cir., Mountain View, CA (US) 94040; Mingjie Lin, 124, Escondido Village, Apt. D, Stanford, CA (US) 94305

( * ) Notice: Subject to any disclaimer, the term of this patent is extended or adjusted under 35 U.S.C. 154(b) by 378 days.

(21) Appl. No.: 11/881,982

(22) Filed: Jul. 31, 2007

(65) Prior Publication Data
US 2009/0037669 A1    Feb. 5, 2009

(51) Int. Cl.
*G06F 12/00*    (2006.01)
(52) U.S. Cl. .................. 711/149; 711/104; 711/105; 711/115; 711/154; 711/165; 711/168; 365/230.05
(58) Field of Classification Search ................ 711/149, 711/104, 105, 115, 154, 165, 168; 365/230.05
See application file for complete search history.

(56) References Cited

U.S. PATENT DOCUMENTS

| | | | |
|---|---|---|---|
| 5,394,536 A | | 2/1995 | Coghlan et al. |
| 5,590,073 A | | 12/1996 | Arakawa et al. |
| 5,687,346 A | * | 11/1997 | Shinohara .................. 711/130 |
| 6,263,400 B1 | * | 7/2001 | Rangasayee et al. ........ 711/108 |
| 6,314,047 B1 | * | 11/2001 | Keay et al. ............. 365/230.05 |
| 7,058,849 B2 | | 6/2006 | Erstad |
| 7,562,193 B2 | * | 7/2009 | Floman et al. ............... 711/149 |

OTHER PUBLICATIONS

Richard M. Mathews, FPGA memory controllers improve DSP performance, reprinted from Military Embedded Systems, Oct. 2005, pp. 42-45.

* cited by examiner

*Primary Examiner*—Stephen C Elmore

(57) ABSTRACT

A new and useful DMA-like arrangement provides fast inter-system transfers of large data volumes. A preferred embodiment of the invention includes a data-transfer-out system and further includes a data-transfer-in system. At least one of the systems has a dual ported memory structure configured in a way so that data can move out of a memory module of the structure from one port while other data can independently move into the memory module through the other port. The systems are detachable with respect to each other, and the memory modules of both systems are correspondingly paired with compatible specifications such as module sizes. Furthermore, these memory modules are physically configured in a way so that inter-system data transfer occurs in a parallel (i.e., module to module) manner without the aid of the CPU of the system that has the dual ported memory structure.

25 Claims, 3 Drawing Sheets

DETACHABLE DIRECT MEMORY ACCESS ARRANGEMENT

BACKGROUND OF THE INVENTION

1. Field of the Invention

The present invention pertains generally to computing system memory management and, more particularly, to copying data to memory of a detachable device using a direct memory access (DMA) mechanism.

2. Background of the Invention

DMA is a well-known technique for transferring data between one sub-system within a computer system to another sub-system without the aid of the system's central processing unit (CPU). Examples of sub-systems using DMA include disk-drive controllers, graphics cards, network cards and sound cards. If the CPU were used, as another example, to transfer program instructions stored on a secondary storage (e.g., hard disk, a RAM drive) into the primary storage (e.g., system RAMs) for execution, operations would be severely slowed and overall system performance severely degraded.

Typically as a solution, a dedicated DMA controller is used to load the program, freeing the CPU for other operations. The DMA controller may include a processor and numerous registers that keep track of the start address from which bytes of data are to be moved, the address to where those bytes should be placed, and the number of bytes involved in the move operation.

Given that the DMA and CPU memory access usually share the same information buses for data and/or commands, therefore, while the DMA controller is executing a memory data transfer, the CPU is not able to access the same memory for read/write operations. One solution to this is to make use of multi-ported or dual ported memories. Generally speaking, the CPU and DMA controller can both access the same memory contents through separate ports with minimal interference to the memory cycle performance.

One disadvantage however is that any typical DMA is a method for intra-system data transfers. It fails to adequately address any large volume (e.g., multiple terabytes or multiple-million files) data transfer needs for inter-system data transfers. Today, there are numerous areas in our society where large volume electronic data transfers are time critical activities, for example, data transfers for electronic evidence such as emails, chat messages and other electronic documentation in discovery proceedings during litigation. Other activities include data transfers of daily financial information, Homeland security processing for air flights and other modes of entries into the USA, and clinical trial related pharmaceutical bioinformatics tasks.

Transferring large volume of data from one system to another is an input/output (I/O) intensive activity where the data transfer bottleneck is its single I/O interface (e.g., IDE, SATA, SCSI Fiber Channel). IDE and SATA interfaces provide a throughput ranging from 150-300 MB/s. USB devices operate at approximately 60 MB/s. Operating at the highest rates and assuming only a few large files, a terabyte (TB) takes approximately 1-2 hours to transfer from one drive to another. When files have smaller sizes, the transfer time could be extended as much as 6-8 hours for the transfer.

SUMMARY OF THE INVENTION

The present invention has been made in consideration of the above described needs and provides particular advantages in high throughput and high speed inter-system data transfers especially those that are time critical in nature.

According to one aspect of the present invention, a data-transfer system using DMA-like mechanism is provided to bypass the I/O interface bottleneck whereby achieving high speed and high throughput in inter-system data transfers. A preferred embodiment of the invention includes a first data-transfer system and further includes a second data-transfer system. At least one of the systems has a dual ported memory structure configured in a way so that data can move out of a memory module of the structure from one port while other data can independently move into an external memory module through the other port. Instead of a dual-ported memory structure, a memory system having a single port but a dual interface is also feasible. The systems are detachable with respect to each other, and the memory modules of both systems are correspondingly paired with compatible specifications such as module sizes and data word lengths. Furthermore, these memory modules may be physically configured in a way so that the first data-transfer system moves data into the second data-transfer system in a parallel (i.e., module to module) manner without the aid of the CPU of the system that has the dual ported memory structure.

Another aspect of the invention teaches that the dual ported memory modules of the one system operate as a single port memory structure if the system is detached from the other system. The switching between the single and dual operating modes can be either software or hardware triggered or both. Moreover, either system may be primarily a storage device or a processing device.

Yet another aspect of the invention discloses that the memory modules of either system may be made of semiconductor memories such as DRAM, SRAM and the like or non-volatile memories such as Flash memories and the like. Further, the memories of the systems may be configured as typical system memories or other pre-allocated memories such as RAM drives or the like.

A further aspect of the invention describes a physical attachment mechanism between the two systems may be provided via one or more adapter boards of one system coupled with the memory module boards of the other system. An intermediate device disposed in between and coupling the two data-transfer systems is also envisioned.

Another further aspect of the invention provides a dual ported memory structure of a data-transfer system having a mirror image of the data to be transferred whereby having at least two data copies. The mirror image may or may not be residing on the same memory module. While a CPU of the data-transfer system accesses one copy the data, data from the other copy in the memory structure may be accessed by another data-transfer system.

Other aspects, together with the foregoing are attained in the exercise of the invention in the following description and resulting in the accompanying drawings.

BRIEF DESCRIPTION OF THE DRAWINGS

A better understanding of these and other features, aspects, and advantages of the present invention can be obtained by considering the following detailed description taken together with the accompanying drawings that illustrate preferred embodiments of the present invention in which.

DETAILED DESCRIPTION OF THE PREFERRED EMBODIMENTS

With today's advances in technology, the design of specialized integrated circuits and programmable logic in computer memory management circuitries and particularly in DMA functionalities generally do not require the rendering of fully detailed circuit diagrams. The definition of logic functionality allows those ordinarily skilled in the art to apply computer design techniques to design the desired logic and circuits. Additionally, digital memory management functionalities are known to operate based on a desired functional diagram rendered into software that is compatible with a selected controller.

Accordingly, portions of the present invention will be described primarily in terms of functionality to be implemented by controllers and other associated electronic components. This functionality will be described in detail with the associated functional diagram. Those of ordinary skill in the art, once given the following descriptions of the various functions to be carried out by the present invention will be able to implement the necessary apparatus and method in suitable technologies without undue experimentation.

Figure 1:
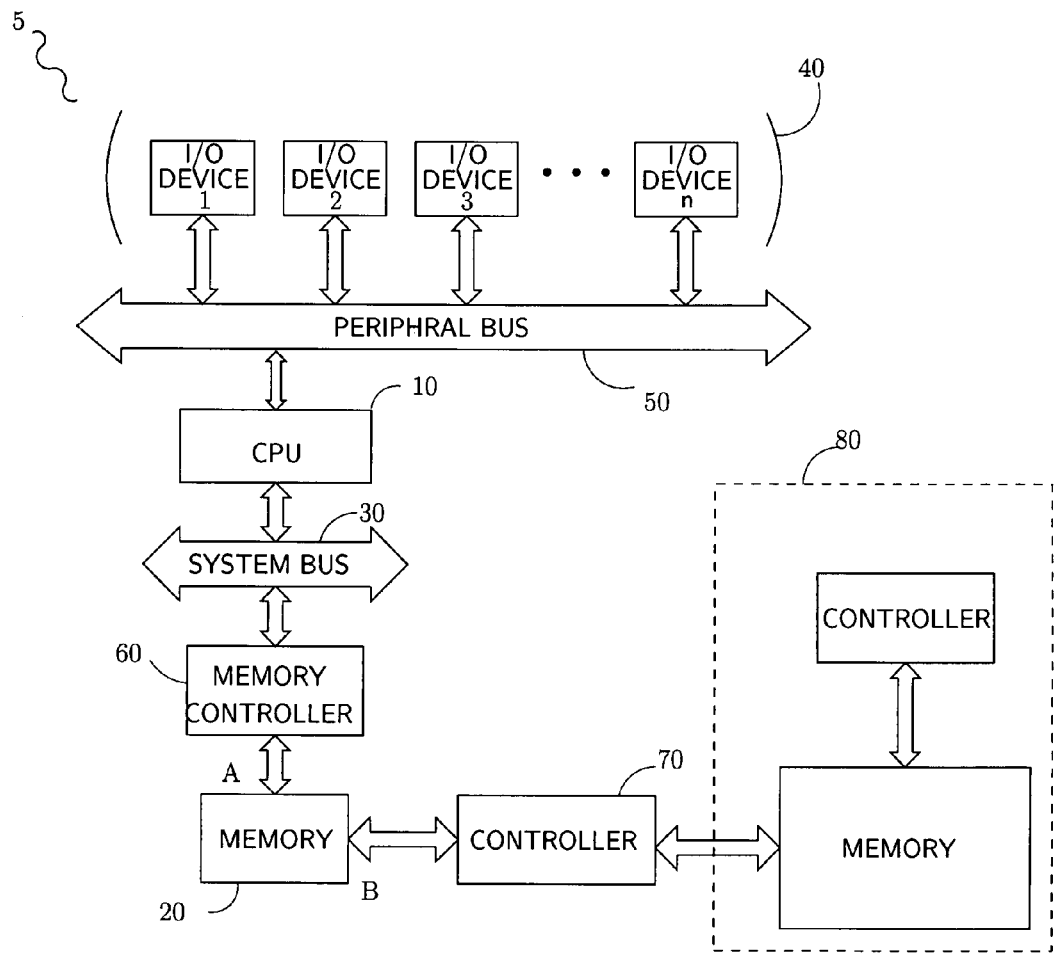
FIG. 1 is a simplified functional block diagram of the parts of a computer system generally pertaining to the memory management function according to a preferred embodiment of the present invention.

FIG. 1 discloses a simplified but relevant functional diagram pertaining to the memory management function of a data-transfer system 5 as a preferred embodiment of the present invention. Referring to FIG. 1, a CPU 10 and a dual-ported memory structure 20 are connected via a system bus 30. The CPU 10 and its associated I/O devices 40 are connected via a peripheral bus 50. The dual-ported memory structure 20 has two ports, A and B. Port A is accessed by the CPU 10 via a memory controller 60, whereas Port B of the memory structure 20 is accessed by a controller 70.

The memory structure 20 may be constructed out of solid state materials. Preferred embodiments may include volatile semiconductor memories such as random access memories (RAMs) and the like, and non-volatile memories such as Flash memories and the like.

An external data-transfer system 80 may be detachably and electrically coupled to the controller 70 to access port B of the memory structure 20 for data transfer. The data-transfer system 5 is configured so that when the external data-transfer system 80 is not attached to and electrically engaged with the controller 70, the data-transfer system 5 operates the memory structure 20 as if It is a single-ported memory structure. This change of mode may be accomplished by the controller 70 on its own feeding back to the memory controller 60, the memory structure 20 and/or the CPU 10 to indicate its inactive status. Additionally, a user-initiated command or a physical/electrical decoupling of the external data-transfer system 80 from the controller 70 may generate a de-trigger signal (not shown) to start the mode change process.

Conversely and analogously, a trigger signal (not shown), may be generated to initiate data transfer through port B via the controller 70 between the data-transfer system 5 and the external data-transfer system 80. To clarify, the trigger signal may be generated by a user-initiated command or by a physical/electrical coupling of the external data-transfer system 80 and the data-transfer system 5 via the controller 70. During this data transfer, data may still be accessed by the CPU 10 or the memory controller 60 of the data-transfer system 5 via port A of the memory structure 20.

Also, either data-transfer system 5 or 80 may be a general computing system or a dedicated data-transfer device arranged to perform large-volume data transfers. Moreover, either data-transfer system 5 or 80 may transmit or receive data during a data transfer operation. As to the physical/electrical coupling of the two systems 5 and 80, a preferred embodiment discloses an adapter board (not shown). That adapter board may be configured to be disposed in between a memory module board (not shown) constituting a part of or the entire memory structure 20 and the memory module board's connector slot to the CPU 10. The adapter board has paths routing the memory module board of the memory structure 20 to the CPU 10 or the memory controller 10 access via port A and at the same time, has paths connecting port B to the external data-transfer system 80. More than one adapter board may be used if there are more than one memory module boards making up the memory structure 20. Moreover, the coupling of the two systems 5, 80 may be interfaced with an intermediate device (not shown) for a dedicated control for the data transfer.

Figure 2:
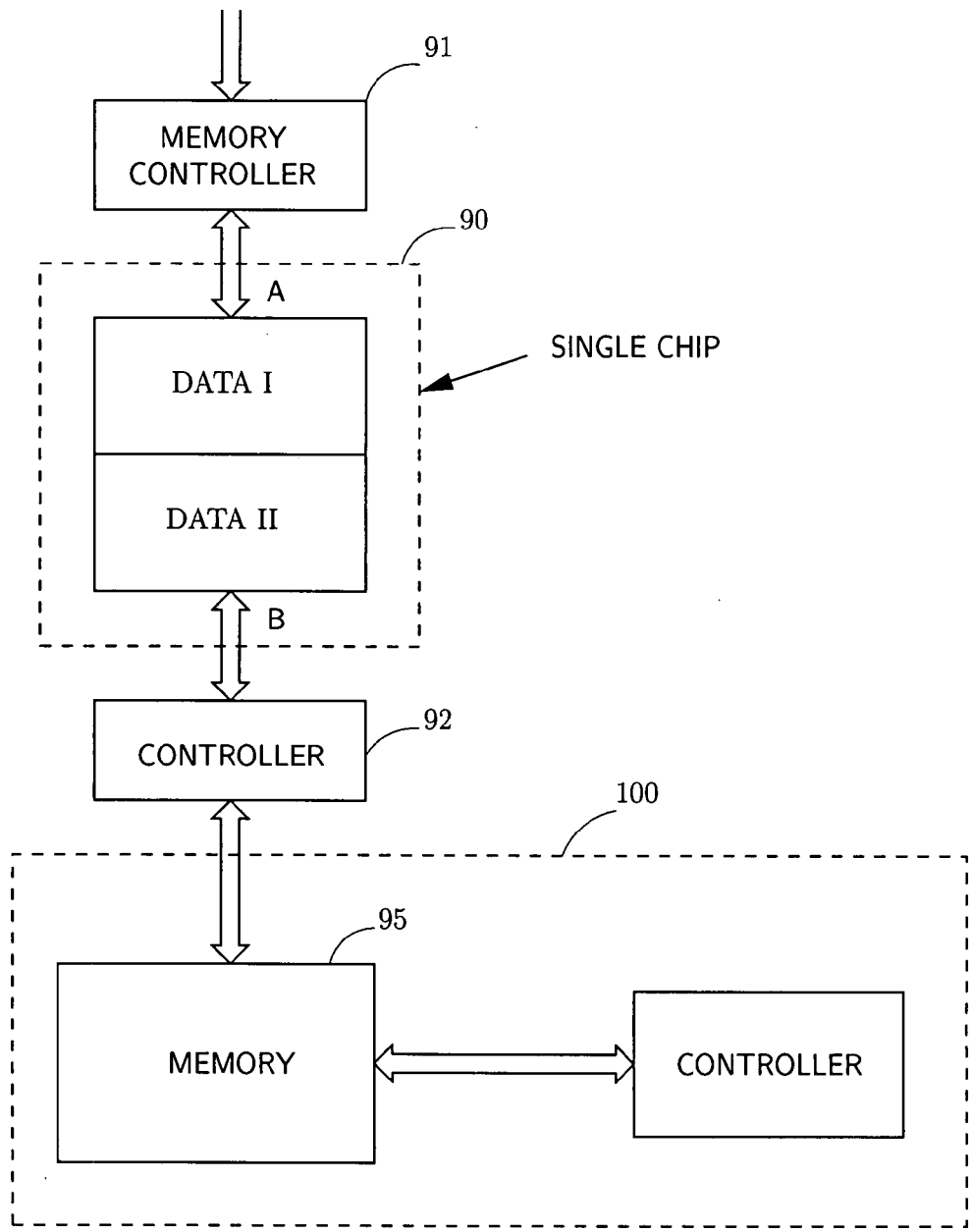
FIG. 2 is a simplified functional block diagram of another aspect of the memory management function of the present invention.

Referring now to FIG. 2, a simplified and relevant block diagram of another aspect of the memory management function of the present invention, there are a first memory structure 90 of a first data-transfer system (not shown) and a second memory structure 95 of a second data-transfer system 100. A memory controller 91 and a controller 92 are associated with the data access control respectively to Port A and Port B of the first memory structure 90. The second data-transfer system 100 is detachably coupled to the first data-transfer system via the controller 92. Data I and Data II consists the total data capacity of the memory structure 90. In a data transfer operation, Data I and Data II may be transferred in its entirety over to the second memory structure 95. It is also possible to have a pre-allocated portion like Data I or Data II to be selectively transferred over. The pre-allocated portion may be a RAM drive, a Flash drive or the like.

In another preferred embodiment, Data II may be a mirror copy of Data I. Advantages of time savings and efficiency are obtained when Data I is accessed by a CPU (not shown) of the first data-transfer system via Port A while at the same time data transfer operations occur with respect to Data II and the second data-transfer system 100 via Port B. Alternatively, Data II may reside on a memory module physically separate from the module containing Data I. Moreover, a separate memory module may be dedicated to mirror the contents of the memory module containing the Data I. Furthermore, instead of a dual-ported memory structure 90, a memory system having a single port but a dual interface is also feasible.

Operationally, a dual-ported memory structure 90 generally allows multiple reads or writes to occur at the same time, or nearly the same time. In one arrangement, each of the dual ports is accessible only by its associated controller. In another arrangement, both ports may be accessible by either controller depending on the operations. For any operation, whether multiple reads and/or writes can occur at the same time depend on the characteristics and limitations of the electronic components involved.

The memory structures 90 and 95 do not have to be of the same memory type. For example, the memory structure 90 may be RAMs while the memory structure 95 may be flash memory or others. However, both structures 90 and 95 should have compatible characteristics such as memory size, access speeds and data word width. One preferred embodiment teaches that both structures 90, 95 having the same memory sizes and data word widths. However, embodiments with different memory sizes are also feasible as long as for example one size is an integer multiple of the other.

Figure 3:
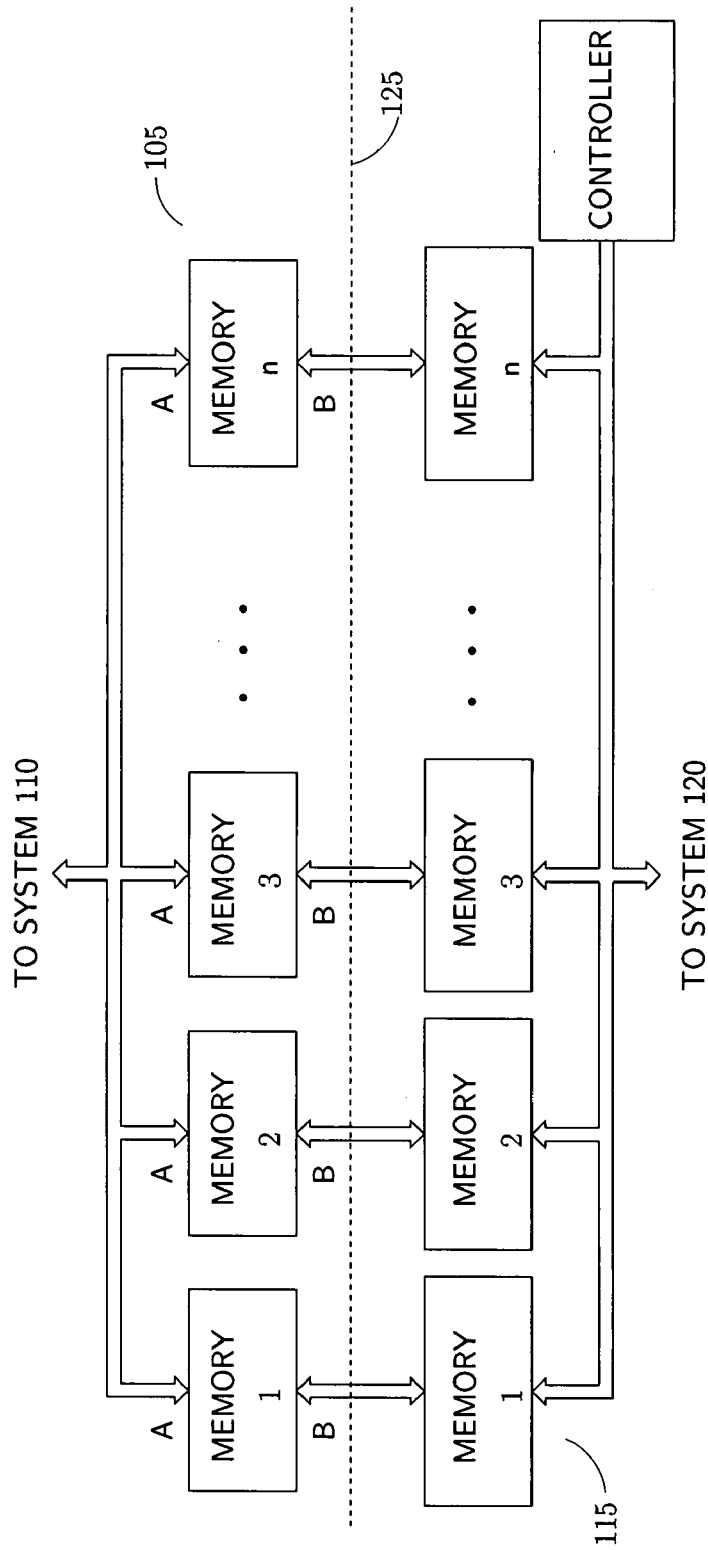
FIG. 3 is a simplified functional block diagram of yet another aspect of the memory management function of the present invention.

Referring now to FIG. 3, a simplified functional diagram illustrating the memory interface between two data-transfer systems 110, 120 according to the present invention, multiple memory modules are illustrated. Memory modules 1 through n make up a memory structure 105 of the first data-transfer system 110. Similarly, another set of memory modules 1 through n make up a memory structure 115 of the second data-transfer system 120. The interfaces of all of the module pairs 1 through n make up the interface 125 between the two memory structures 105, 115 of their respective data-transfer systems 110, 120.

For the structures 105, 115 having the same memory sizes and data word widths, the data lines are connected directly for every module pair 1 through n. Address lines for the module pairs 1 through n are connected, accessed and controlled by a Port B controller. Data transfers may occur between the module pairs 1 through n in a parallel (i.e., module to module) manner without the aid of the CPU of the system. Alternatively, they can also occur between a selected set of module pairs according to their physical addresses or via a logical-address-mapped memory region such as the cases of a RAM drive or a Flash drive.

Data being transferred are written in a way that would allow the system in which it resides to decipher the data without the aid of an external memory mapping table. A memory mapping table could be stored inside the data transferred. Alternatively, the data transferred are files stored and are operated as a part of the storage filing system, for example, Microsoft FAT32. Or for non-file data, for example, system data, sensor data, transactional data and the like, no filing system format Information is needed for access and further processing.

The foregoing description of preferred embodiments of the present invention has been presented for purposes of illustration and description. They are not intended to be exhaustive or to limit the invention to the precise forms disclosed, and obviously many modifications and variations are possible in light of the above teaching. It is intended that the scope of the invention be defined by the claims appended hereto and their equivalents.

What is claimed is:

1. A data transfer system having a memory structure, the data transfer system comprising:
   a CPU;
   said memory structure having one or more dual ported memory modules;
   a memory controller responsive to memory access commands issued by the CPU for controlling data flow through first port(s) of the dual ported memory modules;
   a trigger signal generated to indicate a request to transfer data outside of the system; a controller responsive to the trigger signal, operating to control data flow through a second port(s) of the dual ported memory modules; and
   said memory controller operating the dual ported memory modules as single ported memory modules while the controller being inactive in controlling data flow through the second port(s) of the dual ported memory modules.

2. The data transfer system of claim 1 wherein the dual ported memory modules are semiconductor random access memory (RAM) modules.

3. The data transfer system of claim 1 wherein the dual ported memory modules are non-volatile memory modules.

4. The data transfer system of claim 1 wherein the trigger signal is generated by an external data transfer device electrically coupled directly to the second port(s) of the dual ported memory modules.

5. The data transfer system of claim 1 wherein the trigger signal is generated by a user-initiated command.

6. The data transfer system of claim 1 wherein the memory controller operates the dual ported memory modules as single ported memory modules in response to an absence of request to transfer data outside of the system.

7. The data transfer system of claim 1 wherein the memory controller operates the dual ported memory modules as single ported memory modules in response to a de-trigger signal generated to indicate an absence of request to transfer data outside of the system.

8. The data transfer system of claim 7 wherein the de-trigger signal is generated by an already attached, external data transfer device becoming electrically decoupled from the second port(s) of the dual ported memory modules.

9. A data transfer arrangement including a first data transfer system and a second data transfer system, the data transfer arrangement comprising:
   said first data transfer system having a CPU, one or more dual ported memory modules, a memory controller responsive to memory access commands issued by the CPU for controlling data flow through a first port(s) of the dual ported memory modules, and a controller in response to a trigger signal operating to control data flow through a second port(s) of the dual ported memory modules;
   the trigger signal being generated to indicate an impending data communication between the first and second data transfer systems; and
   said second data transfer system having the same one or more number of memory modules as that of the first data transfer system, the memory modules also having compatible characteristics as those of the first data transfer system, a controller operating to control a flow of data of the memory modules of the second data transfer system in communication with the one or more memory modules of the first data transfer system through the second port(s) of the dual ported memory modules of the first data transfer system.

10. The data transfer arrangement of claim 9 wherein the compatible characteristics include same memory size and data word width for each of the one or more memory modules.

11. The data transfer arrangement of claim 9 wherein the data that flows in communication between the memory modules of the first and second data transfer systems reside in pre-allocated portions of the one or more memory modules of both systems.

12. The data transfer arrangement of claim 9 wherein the data transfer arrangement includes an intermediate device electrically seated between the first and second data transfer systems for control and data pass through purposes.

13. The data transfer arrangement of claim 9 wherein the first data transfer system transfers data into the second data transfer system.

14. The data transfer arrangement of claim 9 wherein the second data transfer system transfers data into the first data transfer system.

15. The data transfer arrangement of claim 9 wherein the trigger signal is generated by electrically coupling directly the second data transfer system to the second port(s) of the dual ported memory modules.

16. The data transfer arrangement of claim 9 wherein the trigger signal is generated by a user-initiated command.

17. The data transfer arrangement of claim 9 wherein the memory controller operates the dual ported memory modules as single ported memory modules while the controller of the first data transfer system being inactive in controlling data flow through the second port(s) of the dual ported memory modules.

18. The data transfer arrangement of claim 9 wherein the memory modules of the second data transfer system are dual ported.

19. The data transfer arrangement of claim 9 wherein the memory modules of the second data transfer system are nonvolatile memory modules.

20. A process for transfer data from a first data transfer system to a second data transfer system, the two systems being electrically coupled, said process comprising:
generating a trigger signal to indicate a request to transfer data from a first pre-allocated portion of one or more dual ported memory modules of the first data transfer system to a second pre-allocated portion of the same one or more number of memory modules of the second data transfer system;
controlling in response to the trigger signal, data flow from dual ported memory modules of the first data transfer system into memory modules of the second data transfer system; and
operating the first data transfer system in an absence of the request to transfer data, the dual ported memory modules as single ported memory modules using a memory controller.

21. The data transfer process of claim 20 wherein the first pre-allocated portion contains information that is a mirror copy of information stored elsewhere in the first data transfer system.

22. The data transfer process of claim 20 wherein the memory modules are electrically coupled and configured to allow the data to flow in a module-to-module, and parallel manner.

23. The data transfer process of claim 20 wherein the two systems are being electrically coupled through one or more adapters physically disposed in a module-to-module manner to connect the one or more dual ported memory modules of the first data transfer system to those of the second data transfer system.

24. A data transfer arrangement including a first data transfer system and a second data transfer system, the data transfer arrangement comprising:
said two data transfer systems each having a CPU, one or more dual ported memory modules, a memory controller responsive to memory access commands issued by the CPU for controlling data flow through a port of the dual ported memory modules and a controller in response to a trigger signal operating to control data flow through the other port of the dual ported memory modules;
the trigger signal being generated to indicate an impending data communication between the first and second data transfer systems; and
the first and second data transfer systems each operating its dual ported memory modules as single ported memory modules while being electrically de-coupled from each other.

25. A data transfer arrangement including a first data transfer system and a second data transfer system, the data transfer arrangement comprising:
said first data transfer system having a CPU, one or more dual ported memory modules, a memory controller responsive to memory access commands issued by the CPU for controlling data flow through a first port(s) of the dual ported memory modules, and a controller in response to a trigger signal operating to control data flow through a second port(s) of the dual ported memory modules;
the trigger signal being generated as a result of the two data transfer systems becoming electrically coupled to each other to indicate an impending data communication between the first and second data transfer systems; and
said second data transfer system having the same one or more number of memory modules as that of the first data transfer system, the memory modules being nonvolatile in nature also having compatible characteristics as those of the first data transfer system, a controller operating to control a flow of data of the memory modules of the second data transfer system in communication with the one or more memory modules of the first data transfer system through the second port(s) of the dual ported memory modules of the first data transfer system.

* * * * *